US012576847B2

(12) United States Patent
Ståhl et al.

(10) Patent No.: US 12,576,847 B2
(45) Date of Patent: Mar. 17, 2026

(54) METHOD AND CONTROL ARRANGEMENT FOR CONTROLLING A VEHICLE DURING A DOWNHILL START

(71) Applicant: Scania CV AB, Södertälje (SE)

(72) Inventors: Daniel Ståhl, Enköping (SE); Martin Berglund, Vagnhärad (SE)

(73) Assignee: Scania CV AB, Södertälje (SE)

( * ) Notice: Subject to any disclaimer, the term of this patent is extended or adjusted under 35 U.S.C. 154(b) by 36 days.

(21) Appl. No.: 18/616,338

(22) Filed: Mar. 26, 2024

(65) Prior Publication Data

US 2024/0343251 A1      Oct. 17, 2024

(30) Foreign Application Priority Data

Apr. 13, 2023    (SE) .................................... 2350427-7

(51) Int. Cl.
B60W 30/18          (2012.01)
B60W 10/18          (2012.01)
(52) U.S. Cl.
CPC ...... B60W 30/18118 (2013.01); B60W 10/18 (2013.01); *B60W 2710/18* (2013.01); *B60W 2720/106* (2013.01)
(58) Field of Classification Search
CPC ... B60T 7/12; B60T 8/24; B60T 8/245; B60T 8/58; B60T 2201/04; B60T 2201/12; B60W 10/18; B60W 30/18118; B60W 30/18127; B60W 2720/106
USPC ...................................................... 701/71–84
See application file for complete search history.

(56) References Cited

U.S. PATENT DOCUMENTS 7,702,432 B2 *    4/2010   Bandai ...................... B60T 1/10
                                                                    701/2
12,049,135 B2 *   7/2024   Aoyama ............. B60W 30/146
                               (Continued)

FOREIGN PATENT DOCUMENTS

| CN | 115246398 A | 10/2022 |
|---|---|---|
| DE | 10039458 A1 | 7/2001 |
| DE | 102019200531 A1 | 7/2020 |
| SE | 539496 C2 | 10/2017 |

OTHER PUBLICATIONS

SCANIA CV AB, Swedish Patent Application No. 2350427-7, Office Action, Jan. 28, 2025.
SCANIA CV AB, Swedish Patent Application No. 2350427-7, Office Action, Nov. 23, 2023.

*Primary Examiner* — Hai H Huynh
*Assistant Examiner* — Johnny H Hoang
(74) *Attorney, Agent, or Firm* — Moore & Van Allen PLLC; W. Kevin Ransom

(57)               ABSTRACT

A method performed by a control arrangement for controlling a vehicle during a downhill start, the vehicle comprising an electric machine configured to propel and/or brake the vehicle and a brake system configured to apply a brake force to the vehicle. The method comprises, following a detection of a downhill start indication, when the vehicle is maintained stationary on an inclined road section by means of a brake force applied by a brake system, controlling the electric machine to apply a brake torque while controlling the brake system to release the applied brake force, and controlling the electric machine to gradually decrease the applied brake torque to control the acceleration of the vehicle when set in motion in a downhill direction on the inclined road section. Hereby, the downhill start is performed in a controlled, safe, and predictable way resulting in an increased comfort and drivability of the vehicle.

14 Claims, 5 Drawing Sheets

(56)     References Cited

U.S. PATENT DOCUMENTS

| | | | |
|---|---|---|---|
| 2010/0076637 A1* | 3/2010 | Ueoka | B60L 50/00 |
| | | | 701/22 |
| 2014/0336860 A1 | 11/2014 | Saitoh et al. | |
| 2015/0203117 A1* | 7/2015 | Kelly | B60W 40/06 |
| | | | 701/91 |
| 2017/0355358 A1* | 12/2017 | Ogawa | B60W 10/00 |
| 2018/0187728 A1* | 7/2018 | Vora | A01B 71/063 |
| 2021/0268911 A1* | 9/2021 | Tabata | B60L 7/26 |
| 2021/0270333 A1* | 9/2021 | Ogawa | B60T 8/1755 |
| 2021/0284017 A1* | 9/2021 | Tabata | B60W 20/50 |
| 2022/0097701 A1 | 3/2022 | Semenov et al. | |
| 2023/0105135 A1* | 4/2023 | Glöckner | B60W 10/182 |
| | | | 701/22 |
| 2023/0278540 A1* | 9/2023 | Kono | B60L 15/2045 |
| | | | 701/22 |
| 2023/0280168 A1* | 9/2023 | Kono | G01C 21/343 |
| 2023/0286393 A1* | 9/2023 | Takebayashi | B60L 15/2045 |

* cited by examiner

METHOD AND CONTROL ARRANGEMENT FOR CONTROLLING A VEHICLE DURING A DOWNHILL START

CROSS-REFERENCE TO RELATED APPLICATIONS

This application claims priority to Swedish Patent Application No. 2350427-7 filed Apr. 13, 2023, of the same title; the contents of each of which are hereby incorporated by reference.

TECHNICAL FIELD

The invention relates to a method and a control arrangement for controlling a vehicle during a downhill start. More specifically, the invention relates to controlling the vehicle following a downhill start indication when the vehicle is maintained stationary on an inclined road section. The invention also relates to a computer program and a computer-readable medium and a vehicle comprising such a control arrangement.

BACKGROUND

The following background description constitutes a description of the background to the invention, which does not, however, necessarily have to constitute prior art.

Modern vehicles, in particular heavy vehicles such a trucks and busses, are often equipped with features such as a hill hold function, which can hold the vehicle stationary for a few second after the driver releases the brake pedal, by automatically applying a brake force by means of wheel brakes. This feature can improve comfort and safety during a takeoff on an inclined road section, as it eliminates the need for the operator to coordinate the brake pedal and the accelerator pedal.

When the vehicle is to be set in motion in a downhill direction on an inclined road section, the wheel brakes are instantaneously released which may result in a sudden and rapid acceleration of the vehicle, especially when the incline is steep, or the vehicle is heavily loaded.

SUMMARY

It is an objective of the present invention to provide methods and control arrangements for mitigating or solving drawbacks of conventional solutions.

According to a first aspect of the invention, aforementioned and further objectives are achieved through a method for a control arrangement configured to control a vehicle during a downhill start, the vehicle comprising an electric machine configured to propel and/or brake the vehicle and a brake system configured to apply a brake force to the vehicle, the method comprising, following a detection of a downhill start indication, when the vehicle is maintained stationary on an inclined road section by means of a brake force applied by a brake system:

controlling the electric machine to apply a brake torque while controlling the brake system to release the applied brake force, and controlling the electric machine to gradually decrease the applied brake torque so as to control the acceleration of the vehicle when set in motion in a downhill direction on the inclined road section.

A downhill start refers here to a start on an inclined road section in a downhill direction. An inclined road section may here be understood as a road section where the vehicle is accelerated by gravity, and hence by a release of the brakes without the need for a propelling power being applied by a power source. A downhill start indication is in the context of the invention a notification of an imminent vehicle take-off either immediately following this notification or at a later time subsequent to the notification depending on the type of the downhill start indication as well as on vehicle configuration. A gradual decrease of the applied brake torque refers here to a progressive reduction of the amount of force applied over a period of time. This reduction in brake torque can be achieved through a controlled release of the brake force.

According to previously known methods, the setting of a vehicle in motion in a downhill direction on an inclined road section may result in an excessive acceleration, e.g., caused by acceleration by gravity, leading to difficulties to effectively maneuver the vehicle during takeoff. This behavior may lead to safety concerns and discomfort for the vehicle operator and passengers. Controlling the vehicle according to the invention by controlling the electric machine to apply a brake torque while the brake force applied by the brake system is released and gradually decrease the applied brake torque when the vehicle is being set in motion prevents uncontrolled acceleration during a downhill start of the vehicle and may result in improved operator and passenger comfort. Moreover, the behavior of the vehicle becomes increasingly predictable as it responds more consistently to driver input resulting in a more reliable vehicle handling as perceived by the vehicle operator.

Furthermore, when the vehicle is set in motion according to the invention, the brake force applied by the brake system may be released instantly without any risk of excessive acceleration of the vehicle. Thereby, gradual release of the brake force may be avoided and the wear on the vehicle brake system, which may occur during such gradual release, may be reduced.

In an embodiment of the invention, the brake torque is applied by the electric machine such that the vehicle remains stationary on the inclined road section prior to setting the vehicle in motion.

By controlling the electric machine to apply a brake torque such that the vehicle remains stationary on the inclined road section prior to setting the vehicle in motion, unintended movement of the vehicle and jerky vehicle start is avoided in the inclined road section. Hereby, the comfort and safety for the vehicle operator are further increased.

In an embodiment of the invention, the vehicle is to be set in motion upon the detection of the downhill start indication, the downhill start indication being one of: a brake release request, a depression of an acceleration pedal or an automatic acceleration request, and wherein the electric machine is controlled to apply the brake torque while controlling the brake system to release the applied brake force upon detecting the downhill start indication.

Hereby, the vehicle is set in motion in a controlled, safe and predictable way when an indication of the vehicle being set in motion is detected.

In an embodiment of the invention, the downhill start indication is a brake release request, and a hill hold function is configured to maintain the vehicle stationary upon detecting the brake release request, the method further comprising:

commencing the control of the electric machine to apply a brake torque upon detecting the brake release request prior to or while controlling the brake system to release the applied brake force.

Hereby, the vehicle is set in motion in a controlled, safe and predictable way when an indication that the vehicle is to be set in motion at a later time subsequent to the indication is detected.

In an embodiment of the invention, the brake system is controlled to maintain the applied brake force when detecting the brake release request and to release the applied brake force upon detecting a depression of an acceleration pedal upon which the vehicle is to be set in motion.

The brake torque is here applied by the electric machine simultaneously as the hill hold function controls the brake system to apply the brake force. Hereby, the vehicle may be maintained stationary on the inclined road section also when the brake force applied by the brake system is not sufficient to, on its own, maintain the vehicle stationary on the inclined road section.

In an embodiment of the invention, the brake system is controlled to maintain the applied brake force when detecting the brake release request and to release the applied brake force upon detecting a hill hold timer expiry upon which the vehicle is to be set in motion.

Hereby, the same advantage as for the preceding claim is achieved.

In an embodiment of the invention, the brake system is controlled to release the applied brake force upon detecting the brake release request.

By commencing the control of the electric machine to apply a brake torque upon detecting the brake release request the vehicle is maintained stationary in the inclined road section also when the applied brake force is released.

In an embodiment of the invention, the electric machine is controlled to gradually decrease the brake torque at a predetermined rate based on at least one vehicle operating parameter.

Consequently, the downhill start may be adapted to current operating conditions of the vehicle. The rate of the gradual decrease of the applied brake torque, i.e., the reduction of the brake torque over time, may be adjusted to the current status and performance of the vehicle. Hereby, the downhill start is performed during various operating conditions in a safe and controlled manner.

In an embodiment of the invention, the at least one vehicle operating parameter is one or more of:

a weight of the vehicle, an inclination of an approaching road section, traffic condition on the approaching road section, a rate of change of the acceleration request, a current drive mode, and an available force that may be transferred between the vehicle and the road.

The approaching road section may here refer to the upcoming road section on which the vehicle is to be set in motion. By controlling the rate at which the brake torque applied by the electric machine in the inclined road section is reduced based on one or more of the above-mentioned vehicle operating parameters, the speed of the vehicle when set in motion on the inclined road section may be controlled to ensure smooth, safe and comfortable acceleration.

In an embodiment of the invention, the releasing of the brake force applied by the brake system is performed gradually, and wherein the predetermined rate of gradual decrease of the brake torque applied by the electric machine is further based on a rate at which the gradual releasing of the brake force is performed.

Hereby, a controlled and smooth acceleration may be achieved also when the brake force applied by a brake system is gradually released.

In an embodiment of the invention, the predetermined rate of gradual decrease of the brake torque applied by the electric machine is further based on a drive torque applied by a power source for propelling the vehicle, other than the electric machine.

Hereby, the gradual decrease of the brake torque applied by the electric machine may counteract the sudden and rapid acceleration which may occur when the vehicle is set in motion on an inclined road section when releasing the brakes. The drive torque applied by a power source for propelling the vehicle, other than the electric machine, together with the brake torque applied by the electric machine may result in a controlled and smooth acceleration when the vehicle is set in motion.

In an embodiment of the invention, the vehicle comprises a plurality of electric machines configured to propel and brake the vehicle, and wherein at least one of the plurality of the electric machines is controlled to apply a brake torque while releasing the brake force applied by the brake system, the method comprising, controlling the at least one of the plurality of electric machines to gradually decrease the applied brake torque so as to control the acceleration of the vehicle when set in motion in the inclined road section.

Hereby, the downhill start is performed in a safe and controlled manner also in vehicles where the invention is carried out by a plurality of electric machines.

According to a second aspect, the invention relates to a control arrangement for controlling a vehicle during a downhill start, the vehicle comprising an electric machine configured to propel and/or brake the vehicle and a brake system configured to apply a brake force to the vehicle, the control arrangement being configured to, following a detection of a downhill start indication, when the vehicle is maintained stationary on an inclined road section by means of a brake force applied by a brake system:

control the electric machine to apply a brake torque while controlling the brake system to release the applied force, and control the electric machine to gradually decrease the applied brake torque so as to control the acceleration of the vehicle when set in motion in a downhill direction on the inclined road section.

It will be appreciated that all the embodiments described for the method aspects of the invention are applicable also to at least one of the control arrangement aspects of the invention. Thus, all the embodiments described for the method aspects of the invention may be performed by the control arrangement, which may also be a control device, i.e. a device. The control arrangement and its embodiments have advantages corresponding to the advantages mentioned above for the methods and their embodiments.

According to a third aspect of the invention, aforementioned and further objectives are achieved through a vehicle comprising the control arrangement of the second aspect.

According to a fourth aspect, the invention relates to a computer program comprising instructions which, when the program is executed by a computer, cause the computer to carry out the method according to the first aspect.

According to a fifth aspect, the invention relates to a computer-readable medium comprising instructions which, when executed by a computer, cause the computer to carry out the method according to the first aspect.

BRIEF DESCRIPTION OF THE DRAWINGS

Embodiments of the invention will be illustrated in more detail below, along with the enclosed drawings, where similar references are used for similar parts, and where.

DETAILED DESCRIPTION

Setting a vehicle in motion in a downhill direction on an inclined road section can pose several risks and issues. The process of setting a vehicle in motion depends on the vehicle configuration and functionality. An example of a functionality which may affect a downhill start is a hill hold function. When the hill hold function is active, the system holds the vehicle stationary for a few seconds, by automatically continuing to apply a brake force by means of the wheel brakes, after the operator releases the brake pedal. This prevents the vehicle from rolling and makes the start of the vehicle easier and safer. The operator only needs to press the accelerator pedal to set the vehicle in motion when required. When the accelerator pedal is depressed, the brake force is instantaneously released, and the vehicle is set in motion. However, abruptly releasing the brake force when starting downhill in an inclined road section may give rise to a sudden and rapid acceleration when the vehicle is set in motion which is not ideal from a comfort and drivability perspective.

It is therefore an objective of the present invention to provide a method and a control arrangement for controlling a vehicle when the vehicle is set in motion in a downhill direction on an inclined road section, such that these problems are at least partly solved.

Figure 1:
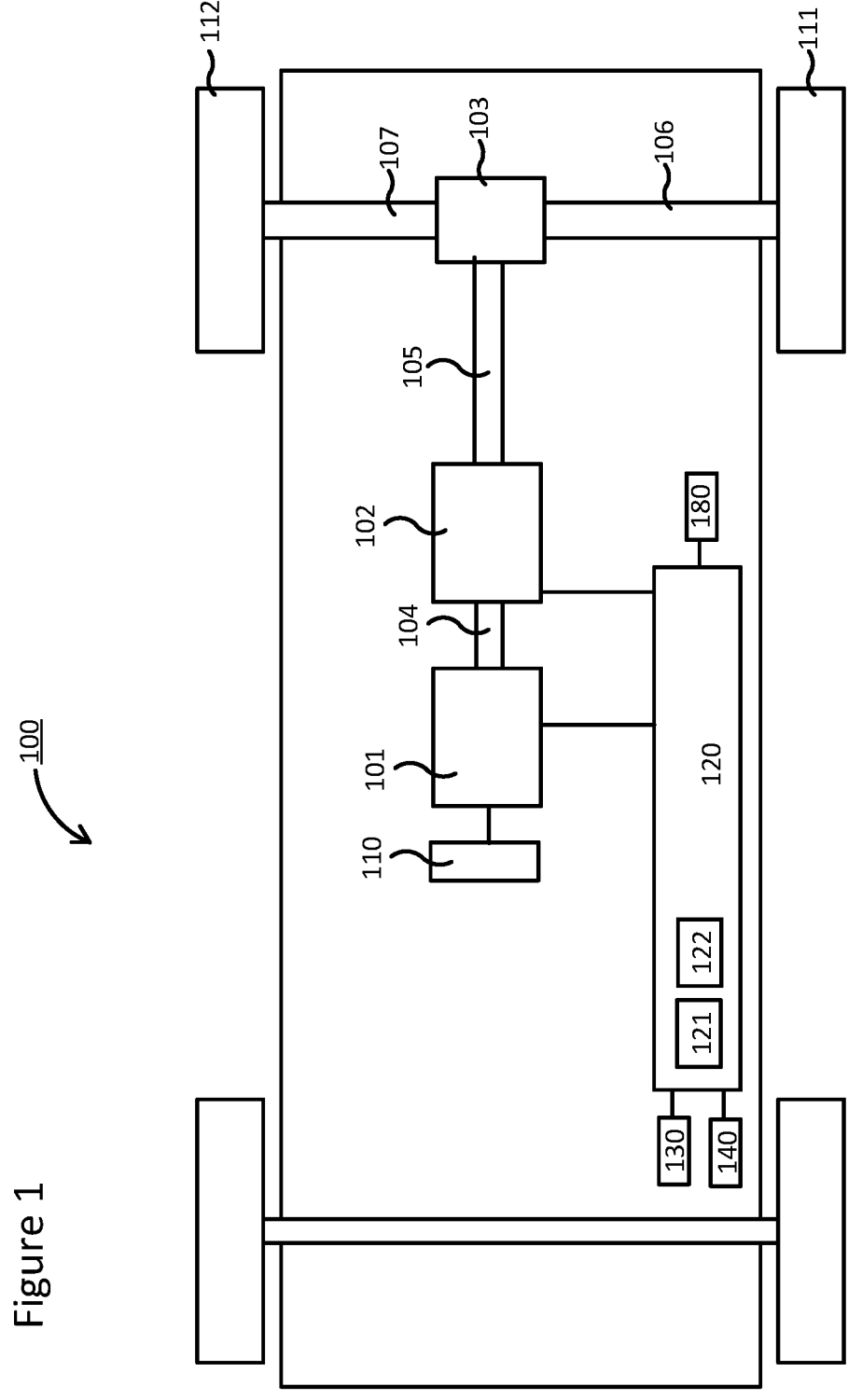
FIG. 1 shows an example vehicle, in which embodiments of the present invention may be implemented.

FIG. 1, which will be used to explain the herein presented embodiments, schematically illustrates a vehicle 100 and its powertrain. The vehicle 100 may, e.g., be a car, a bus, or a truck. The powertrain of the vehicle 100 illustrated in FIG. 1 comprises an electric motor system with at least one electric machine 101 configured for driving the drive wheels 111, 112 of the vehicle 100. In the shown embodiment, the vehicle 100 comprises two drive wheels 111, 112 but it should be understood that the vehicle 100 may be arranged with one or more drive wheels. The at least one electric machine 101 may, as depicted in FIG. 1, be connected to a gearbox 102 via an input shaft 104. The vehicle 100 may comprise a propeller shaft 105 from the gearbox 102 which drives the drive wheels 111, 112 via a central gear 103, for example a conventional differential, and two drive shafts 106, 107 of the vehicle 100. It should be understood that the vehicle 100 may be arranged in any known way, for example without a gearbox 102 or conventional differential without limiting the scope of the invention.

The at least one electric machine 101 may be arranged essentially anywhere, as long as torque is provided to one or more of the wheels 111, 112. The at least one electric machine 101 may be provided with electric power from a power supply system configured for powering the electric machine and thereby the vehicle. Such power supply system may for example comprise a high voltage battery system 110 included in the electric motor system of the vehicle 100 or an external power supply such as a pantograph from an e-highway.

The vehicle 100 may, as illustrated in FIG. 1, be a pure electric vehicle (EV) only including the one or more electric machines 101 for driving the drive wheels 111, 112. However, the vehicle 100 may also be a so-called hybrid vehicle and also include an internal combustion engine (not depicted) which may, in a conventional manner, be connected to the gearbox 102, e.g., via a clutch (not depicted).

The electric motor system including the electric machine 101 as well as other components of the vehicle's powertrain may be controlled by a vehicle control system via a control arrangement 120. The control arrangement 120 may be distributed on several control units configured to control different parts of the vehicle 100 and is thus not limited to the schematic illustration in FIG. 1. The control arrangement 120 may e.g. include units 121 and 122 arranged for performing the method steps of the disclosed invention as is explained further on. The control arrangement 120 and/or another control arrangement may further be configured for controlling any other units/devices/entities of the vehicle 100. The control arrangement 120 will be described in further detail in FIG. 6.

The vehicle 100 may further comprise one or more sensors 130, e.g., for measuring at least one parameter related to one or more of vehicle operating conditions located at suitable positions within the vehicle 100. It is to be understood that the above mentioned one or more sensors 130 may be configured for communication with the control arrangement 120 to provide the control arrangement 120 with relevant information.

Further, the vehicle 100 may comprise a positioning system/unit 180. The positioning unit 180 may be based on a satellite navigation system such as the Navigation Signal Timing and Ranging (Navstar), Global Positioning System (GPS), Differential GPS (DGPS), Galileo, GLONASS, or the like. Thus, the positioning unit 180 may comprise a GPS receiver.

Figure 2A:
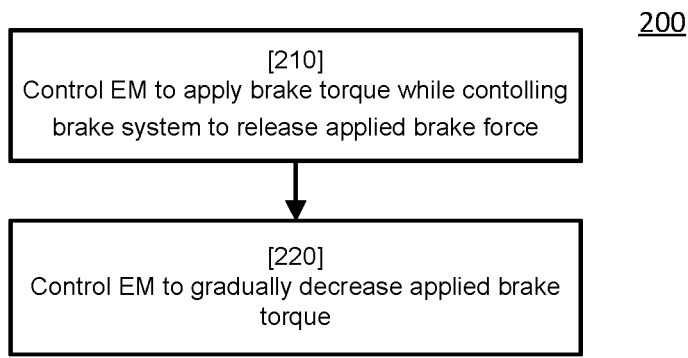
FIG. 2a shows a flow chart of a method for controlling a vehicle during a downhill start according to embodiments of the invention.

The proposed solution will now be described with reference to a method 200 disclosed in FIG. 2a and the vehicle 100 disclosed in FIG. 1. FIG. 2a illustrates a flow chart of the method 200 performed, e.g., by a control arrangement 120 configured to control the vehicle 100 during a downhill start. The vehicle 100 comprises an electric machine 101 configured to propel and/or brake the vehicle 100 and a brake system configured to apply a brake force to the vehicle 100. The method 200 comprises, following a detection of a downhill start indication, when the vehicle 100 is maintained stationary on an inclined road section by means of a brake force applied by a brake system:

in step 210, controlling the electric machine 101 to apply a brake torque while controlling the brake system to release the applied brake force, and in step 220 controlling the electric machine 101 to gradually decrease the applied brake torque so as to control the acceleration of the vehicle 100 when set in motion in a downhill direction on the inclined road section.

Figures 3, 4:
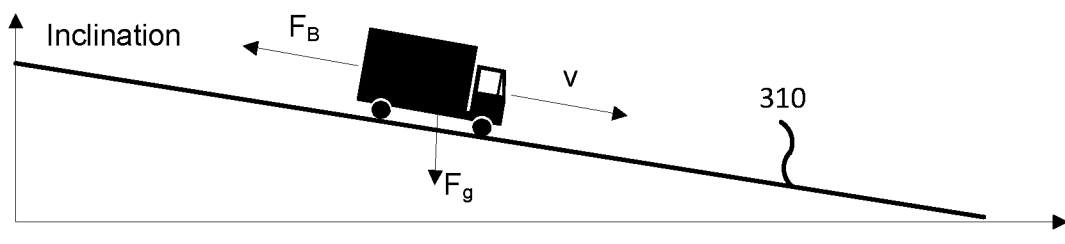
FIG. 3 illustrates a driving situation where the embodiments of the invention may be applied.
FIG. 4 illustrates downhill start control in a vehicle according to an embodiment of the invention.

A driving situation where the invention may be applied is illustrated in FIG. 3. Here, the vehicle 100 is maintained stationary on an inclined road section 310 with the intention to perform a start in the downhill direction. The scope of the invention is not limited to the direction of the vehicle 100 on the inclined road section 310. Thus, the vehicle may be maintained stationary on the inclined road section facing either uphill or downhill. Setting the vehicle 100 in motion in the downhill direction may comprise a forward start of the vehicle when facing downhill or a downhill start in the reverse direction when the vehicle faces uphill on the inclined road section. The inclination of the inclined road section is illustrated as being constant in FIG. 3. As is realized, the inclination may vary substantially over the inclined road section. The arrows $F_B$ and $F_g$ in FIG. 3 illustrate the brake force and the gravity force acting on the vehicle on the inclined road section, and the arrow v represents the vehicle speed.

The control of the vehicle 100 in the above-described driving situation is illustrated in FIG. 4 using graphs 402, 404 and 406 depicting different operation conditions of the vehicle 100 and the corresponding vehicle dynamics over time T. Graph 402 illustrates the applied brake force $F_B$ in the vehicle 100. Graph 404 illustrates the applied torque in the vehicle 100, and graph 406 shows the resulting vehicle speed over time T. According to the example in FIG. 4 maintaining the vehicle 100 stationary on the inclined road section 310 may be done by automatically controlling, e.g., by means of the control arrangement 120, a brake system in the vehicle 100 to apply a brake force $F_1$ at least counteracting the net downhill force acting on the vehicle 100 due to gravity as illustrated in graph 402 in FIG. 4 between the time instance $T_0$ and the time instance $T_1$. That means that the force $F_1$ applied by the brakes needs to be equal to or greater than the force of gravity $F_g$ acting on the vehicle 100 to prevent the vehicle 100 from moving downhill. Thus, as illustrated in graph 406, the speed v of the vehicle 100 between the time instance $T_0$ and the time instance $T_1$ is 0. The brake system may, for example, be wheel brakes or parking brakes of the vehicle 100 and may be controlled according to conventional methods. The brake system may, for example, be controlled automatically by the vehicle control arrangement 120 based on manual brake request from the vehicle operator or on an automatically generated brake request. The manual brake request from the vehicle operator may comprise pressing down a brake pedal or activating the parking brake.

According to previously known methods, when the vehicle 100 is to be set in motion in the downhill direction on the inclined road section 310 while maintained stationary by means of automatically controlled brake system, the applied brake force is released instantaneously at the time instance $T_1$ based on a downhill start indication such as for example a manual or an automatic acceleration request. Simultaneously, or shortly after the release of the applied brake force, a positive torque is delivered from the vehicle power source as illustrated by the dashed line in graph 404 in FIG. 4 between the time instance $T_1$ and $T_2$. Such instantaneous release of the applied brake force may give rise to a sudden and rapid acceleration as illustrated by the dashed line in graph 406 between the time instance $T_1$ and $T_2$ when the speed of the vehicle 100 is increased to a requested speed $v_{req}$. In situations when a gear upshift is performed when the vehicle is set in motion, the acceleration may be further increased especially when the vehicle is rolling on a steep downhill road section with no gear engaged. Such rapid acceleration is not ideal from a comfort and drivability perspective. Moreover, the speed of the vehicle and the acceleration during such starts on an inclined road section in the downhill direction may be difficult to control.

The invention enables a control of the vehicle speed and acceleration when the vehicle 100 is set in motion in the downhill direction on the inclined road section 310 such that the vehicle start is performed in a more controlled manner. This is achieved by controlling the electric machine 101 to apply a brake torque while controlling the brake system to release the applied brake force according to method step 210 in FIG. 2a, followed by method step 220 where the electric machine 101 is controlled to gradually decrease the applied brake torque so as to control the acceleration of the vehicle 100 when set in motion in a downhill direction on the inclined road section 310. A non-limiting example of how the invention may be applied is illustrated in FIG. 4. Thus, as illustrated by the solid line in graph 404 in FIG. 4, upon detecting a downhill start indication at the time instance $T_1$ indicating that the vehicle 100 is to be set in motion, the brake force $F_1$ applied by the vehicle brake system is released and a brake torque $T_{brake}$ is applied by means of the electric machine 101. The applied brake torque $T_{brake}$ is then gradually decreased to control the acceleration of the vehicle 100 when set in motion.

In the example illustrated in FIG. 4, the brake torque is gradually decreased between the time instance $T_1$ and the time instance $T_2$ whereafter the torque continues to gradually increase between the time instances $T_2$ and $T_3$ resulting in a propelling torque required to achieve a required acceleration and vehicle speed $v_{req}$. However, the invention is not limited to the example illustrated in FIG. 4. In further implementations, the propelling torque may be instead applied by a power source for propelling the vehicle 100, other than the electric machine 101, wherein the brake torque $\tau_{brake}$ applied by the electric machine 101 and gradually decreased when the vehicle 100 is set in motion only counteracts the previously described rapid acceleration which otherwise would occur. The invention thus controls the speed of the vehicle 100, illustrated by the solid line between the time instance $T_1$ and the time instance $T_3$, such that a smooth acceleration can be achieved when the vehicle 100 is set in motion in forward direction on the inclined road section 310 also when the applied brake force $F_1$ is instantaneously released as described above.

The brake torque $\tau_{brake}$ may be a torque such that when applied, the vehicle remains stationary on the inclined road section 310. The invention is not limited to the example illustrated in FIG. 4 where the brake torque is applied upon detection of the downhill start indication. In an embodiment, the brake torque may be applied by the electric machine 101 such that the vehicle remains stationary on the inclined road section 310 prior to setting the vehicle 100 in motion, i.e., prior to the time instance $T_2$, as will be explained further on.

Figure 2B:
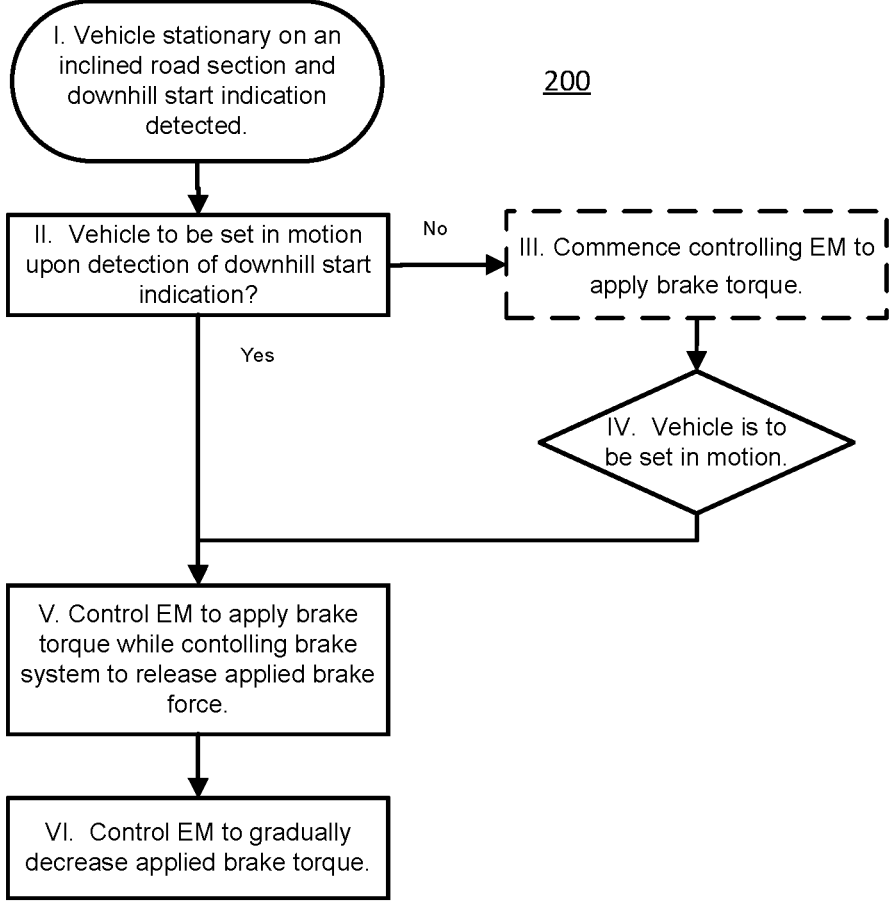
FIG. 2b shows a flow chart of a method for controlling a vehicle during a downhill start according to further embodiments of the invention.

The method 200 according to FIG. 2a as well as further embodiments of the invention will now be explained more in detail with reference to FIG. 2b. FIG. 2b discloses a flowchart of the method 200 comprising steps corresponding to the method steps 210-220 described with reference to FIG. 2a as well as further optional steps which may, in embodiments, be comprised in the method 200. It should be noted that the method steps illustrated in FIG. 2b and described herein do not necessarily have to be executed in the illustrated order. The steps may essentially be executed in any suitable order, as long as the physical requirements and the information needed to execute each method step is available when the step is executed.

The invention starts in step I in FIG. 2b when the vehicle 100 is maintained stationary on an inclined road section and is about to be set in motion in a downhill direction on the inclined road section following a detection of a downhill start indication. As previously explained, the downhill start indication is an indication of an impending vehicle take-off, either immediately when the downhill start indication is detected or after the downhill start indication has been detected based on vehicle configuration. The vehicle configuration may here refer to one or more vehicle function which may impact when the vehicle is to be set in motion following the detection of a specific downhill start indication. An example of such a vehicle function is a hill hold function being activated in the vehicle. A downhill start indication may comprise a brake release request, a depression of an accelerator pedal, or an automatic acceleration request. Moreover, when hill hold function is activated, the downhill start indication may further comprise a hill hold timer expiry. A hill hold timer is typically engaged when a vehicle is stopped on an inclined road section and is maintained stationary during a certain time after a brake pedal has been released. When the hill hold time expires, the brake force applied by the brake system is released. The downhill start indication may be detected by the control arrangement 120 according to conventional methods, based on e.g., information from the one or more sensors 130 in the vehicle 100 or by the vehicle control system.

In step II in FIG. 2*b*, it is determined if the vehicle is to be set in motion upon detection of the downhill start indication.

As previously explained, the driving situation illustrated in FIG. 4, shows the vehicle being set in motion upon detection of the downhill start indication at the time instance $T_1$. The downhill start indication may here comprise a depression of an acceleration pedal or an automatic acceleration request. The depression of an acceleration pedal and the automatic acceleration request, such as a speed resume generated by a cruise control function controlling the speed of the vehicle 100, are downhill start indications which, when detected, always indicate a request to immediately set the vehicle 100 in motion independently of the vehicle configuration. Furthermore, the downhill start indication may comprise a brake release request. The brake release request may, for example be based on a manual request by the vehicle operator releasing a brake pedal or deactivating a parking brake. When no hill hold function is active in the vehicle 100, such brake release request result in the vehicle being set in motion in the inclined road section due to gravity forces acting on the vehicle 100.

Figure 5:
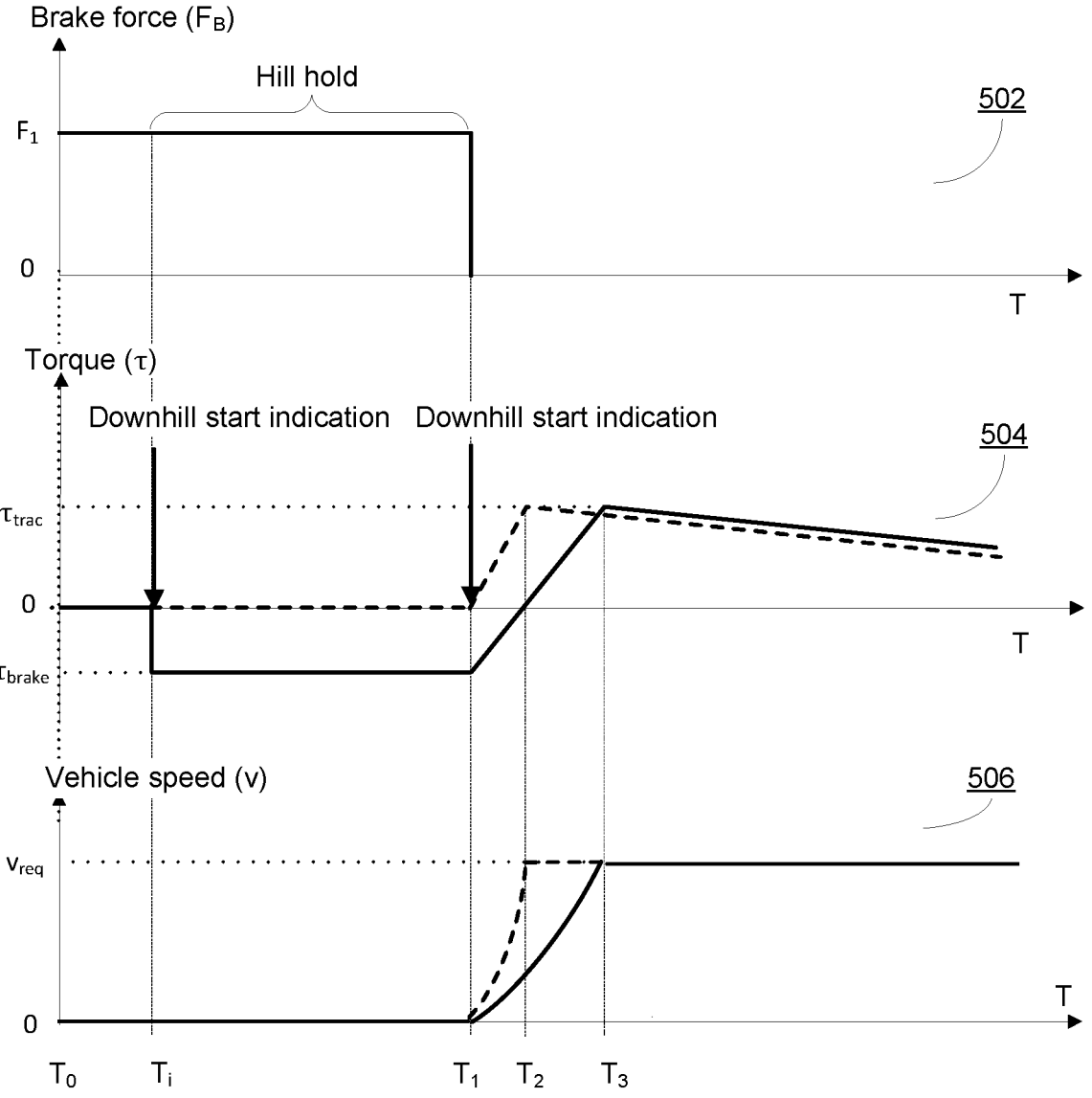
FIG. 5 illustrates downhill start control in a vehicle according to a further embodiment of the invention.

A further embodiment of vehicle control during a downhill start is illustrated in FIG. 5. Correspondingly to the embodiment shown in FIG. 4, FIG. 5 relates to the driving scenario illustrated in FIG. 3 and shows graph 502 illustrating the applied brake force $F_B$ in the vehicle 100 over time T, graph 504 illustrating the applied torque in the vehicle 100 over time T, and graph 506 illustrating the resulting vehicle speed over time T. In contrast to the embodiment shown in FIG. 4, the vehicle in FIG. 5 is configured with a hill hold function. As shown in the graph 502 in FIG. 5, a brake force $F_B$ is applied to the vehicle 100 by means of a brake system between the time instance $T_0$ and the time instance $T_i$ to maintain the vehicle 100 stationary on the inclined road section with the vehicle speed being 0, as previously explained with reference to FIG. 4. At the time instance $T_i$ a downhill start indication is detected. The downhill start indication is here a brake release request. As previously explained, the brake release request may be based on a manual request by the vehicle operator releasing a brake pedal or deactivating a parking brake. The detecting of the downhill start indication at the time instance $T_i$ does not result in the vehicle 100 being immediately set in motion when the downhill start indication is a brake release request. Instead, a hill hold request is generated, i.e., an automatic request to apply a brake force to maintain the vehicle 100 stationary after the manual brake has been released. The vehicle brake system is thus automatically controlled to keep the vehicle stationary until a further downhill start indication is detected at the time instance $T_1$. The further downhill start indication may be a depression of an acceleration pedal, or a time-out of a hill hold timer.

Thus, when the downhill start indication detected in step I in FIG. 2*b* is one of a depression of an acceleration pedal, an automatic acceleration request or a brake release request when no hill hold function is active in the vehicle 100, the vehicle 100 is to be set in motion, i.e., "yes" in step II in FIG. 2*b*, whereafter the method 200 continues to step V.

Alternatively, when the downhill start indication detected in step I in FIG. 2*b* is a brake release request and the hill hold function is active in the vehicle 100, the vehicle 100 is not to be set in motion, i.e., "no" in step II in FIG. 2*b*, whereafter the method continues to step III.

In embodiments, in an optional step Ill in FIG. 2*b*, the method 200 comprises commencing the control of the electric machine 101 to apply a brake torque upon detecting the brake release request prior to or while controlling the brake system to release the applied brake force as illustrated in FIG. 5.

The invention may thus control the electric machine 101 to commence applying the brake torque upon detecting the brake release request at the time instance $T_i$ which may occur prior to or while controlling the brake system to release the applied brake force at the time instance $T_1$ in FIG. 5.

By commencing to apply the brake torque by means of the electric machine 101 upon detecting the brake release request prior to or while controlling the brake system to release the applied brake force, the brake force applied by the brake system may be reduced or even released without the vehicle being set in motion due to the brake torque applied by the electric machine 101. In other words, the brake system may, in an embodiment, be controlled to release the applied brake force upon detecting the brake release request.

In an embodiment, the brake system may be controlled to maintain the applied brake force when detecting the brake release request, as illustrated in FIG. 5 at the time instance $T_i$, and to release the applied brake force upon detecting a further downhill start indication at the time instance $T_1$. The further downhill start indication may be depression of an acceleration pedal or a hill hold timer expiry upon which the vehicle 100 is to be set in motion. The brake torque may be applied by the electric machine 101 simultaneously as the hill hold function controls the brake system to apply a brake force.

In step V, in FIG. 2*b*, corresponding to the step 210 in FIG. 2*a*, the electric machine 101 is controlled to apply a brake torque while controlling the brake system to release the applied brake force. Thus, if the brake torque has not yet been applied by the electric machine 101 based on a brake release request according to the optional step Ill in FIG. 2*b*, it is applied when the brake force applied by the brake system is released.

In step VI, in FIG. 2*b*, corresponding to step 220 in FIG. 2*a*, the electric machine 101 is controlled to gradually decrease the applied brake torque so as to control the acceleration of the vehicle 100 when set in motion in a downhill direction on the inclined road section 310.

In an embodiment, the electric machine 101 may be controlled to gradually decrease the brake torque at a predetermined rate based on at least one vehicle operating parameter. The at least one vehicle operating parameter may be one or more of a weight of the vehicle 100, or alternatively the vehicle mass, an inclination of an approaching road section, traffic condition on the approaching road section, a rate of change of the acceleration request, a current drive mode, and an available force that may be transferred between the vehicle and the road. As previously explained, the approaching road section may here refer to the road section where the vehicle 100 is to be set in motion. Thus, the gradual decrease if the applied brake torque can be controlled at different rates depending on current operating conditions and vehicle configuration and performance. For example, if the vehicle load is high and/or the inclination of the approaching road section is large, the rate of gradually decreasing the applied brake torque can be relatively low resulting in the torque being decreased slowly to prevent the acceleration from increasing at an undesirable rate.

In similar fashion, the rate of gradually decreasing the applied brake torque may be based on the required acceleration of the vehicle during the downhill start. The required acceleration may be determined based on e.g., a traffic condition on the approaching road section. It may, for example, be required to adapt the speed of the vehicle 100 to the speed and acceleration of a vehicle in front, which may be done by adapting the rate of gradually decreasing the applied brake in a suitable manner.

The required acceleration may, furthermore, be determined based on e.g., a rate of change of the acceleration request. The rate of change of the acceleration request may here refer to the speed at which the accelerator pedal is depressed. A low rate of change of the acceleration request may for example correspond to a low required acceleration which may in turn correspond to a relatively low rate of gradually decreasing the applied brake torque. Moreover, the required acceleration may be determined based on a current drive mode. When driving in economy mode an energy efficient way of driving and acceleration is prioritized. In sport mode a more aggressive acceleration may be allowed resulting in a higher rate of gradually decreasing the applied brake torque.

As previously explained, the rate of gradually decreasing the applied brake torque may furthermore be based on an available force that may be transferred between the vehicle and the road. When the available force that transferred between the vehicle and the road is low, which may occur during e.g., slippery road conditions, the duration of applying the brake torque by means of the electric machine 101 when no brake force is applied by the brake system in the vehicle 100, should be kept low to reduce the risk of wheel slip. Consequently, a higher rate of decreasing the applied brake torque may be preferred when the available force that is transferred between the vehicle and the road is low compared to when the transferred force is higher.

Alternatively, the rate of gradually decreasing the applied brake torque may also depend on a change of the at least one vehicle operating parameter. For example, if the operating parameter varies over time when the vehicle 100 is to be set in motion, then a variable rate of gradually decreasing the applied brake torque dependent on the variation of the operating parameter over time can be used. Hence, if a gradual increase of the road inclination is detected, the rate of gradually decreasing the applied brake torque may be decreased.

When the vehicle 100 is to be set in motion, the at least one vehicle operating parameter may be monitored. The rate at which the brake torque is to be gradually decreased may be determined for example based one of more thresholds related to the monitored at least one vehicle operating parameter. Alternatively, the rate at which the brake torque is to be gradually decreased may be determined according to conventional methods using e.g. Newton's laws of motion so that a required acceleration is obtained when the vehicle 100 is set in motion on the inclined road section.

The vehicle internal parameters like weight of the vehicle 100, the rate of change of the acceleration request and the current drive mode may be obtained from the vehicle's control system via one or more communication buses linking the control arrangement 120 with various components and controllers located in the vehicle. Parameters related to the approaching road section such as the road inclination may e.g. be determined on the basis of map data, e.g. from digital maps containing topographical information, in combination with positioning information, e.g. GPS information. The positioning information may be used to determine the location of the vehicle relative to the map data so that the road inclination can be extracted from the map data. Various present-day cruise control systems use map data and positioning information. Such systems may then provide the map data and positioning information required for the method according to the present disclosure, thereby minimizing the additional complexity involved in determining the road inclination. The inclination of an approaching road section as well as the current traffic conditions on the approaching road section may furthermore be determined based on information obtained from one or more sensors 130 in the vehicle, such radar information, camera information, or information from another vehicle. It may also be retrieved from positioning information and road gradient information stored previously on board, or from information obtained from traffic systems related to the expected travelling route. In systems where there is information exchange between vehicles, road gradients estimated by one vehicle may also be made available to other vehicles, either directly or via an intermediate unit such as a database or the like.

As previously explained, the propelling torque may be applied by a power source for propelling the vehicle 100, other than the electric machine 101, wherein the brake torque $\tau_{brake}$ applied by the electric machine 101 and gradually decreased when the vehicle 100 is set in motion only counteracts the previously described rapid acceleration which otherwise would occur. The invention controls thus the speed of the vehicle 100, illustrated by the solid line between the time instance $T_1$ and the time instance $T_3$, in graph 406 in FIG. 4 and in graph 506 in FIG. 5, such that a smooth acceleration can be achieved when the vehicle 100 is set in motion in forward direction on the inclined road section 310 also when the applied brake force $F_1$ is instantaneously released as described above. In an embodiment, the predetermined rate of gradual decrease of the brake torque applied by the electric machine 101 may further be based on a drive torque applied by a power source for propelling the vehicle 100, other than the electric machine 101.

In an embodiment, the vehicle 100 may comprise a plurality of electric machines 101 configured to propel and brake the vehicle 100, wherein at least one of the plurality of the electric machines is controlled to apply a brake torque while releasing the brake force applied by the brake system. The method may comprise controlling the at least one of the plurality of electric machines 101 to gradually decrease the applied brake torque so as to control the acceleration of the vehicle 100 when set in motion in the inclined road section.

According to an aspect of the invention, a control arrangement 120 for controlling a vehicle 100 during a downhill start is presented. The vehicle 100 comprises an electric machine 101 configured to propel and/or brake the vehicle 100 and a brake system configured to apply a brake force to the vehicle 100.

The control arrangement 120 includes means 121 arranged to, following a detection of a downhill start indication, when the vehicle 100 is maintained stationary on an inclined road section by means of a brake force applied by a brake system, control the electric machine 101 to apply a brake torque while controlling the brake system to release the applied force.

Moreover, the control arrangement 120 includes means 122 arranged to control the electric machine 101 to gradually decrease the applied brake torque so as to control the acceleration of the vehicle 100 when set in motion in the inclined road section.

The control arrangement 120, e.g. a device or a control device, according to the invention may be arranged for performing all of the above, in the claims, and in the herein described embodiments method steps. The control arrangement 120 is hereby provided with the above described advantages for each respective embodiment.

The invention is also related to a vehicle 100 including the control arrangement 120.

Figure 6:
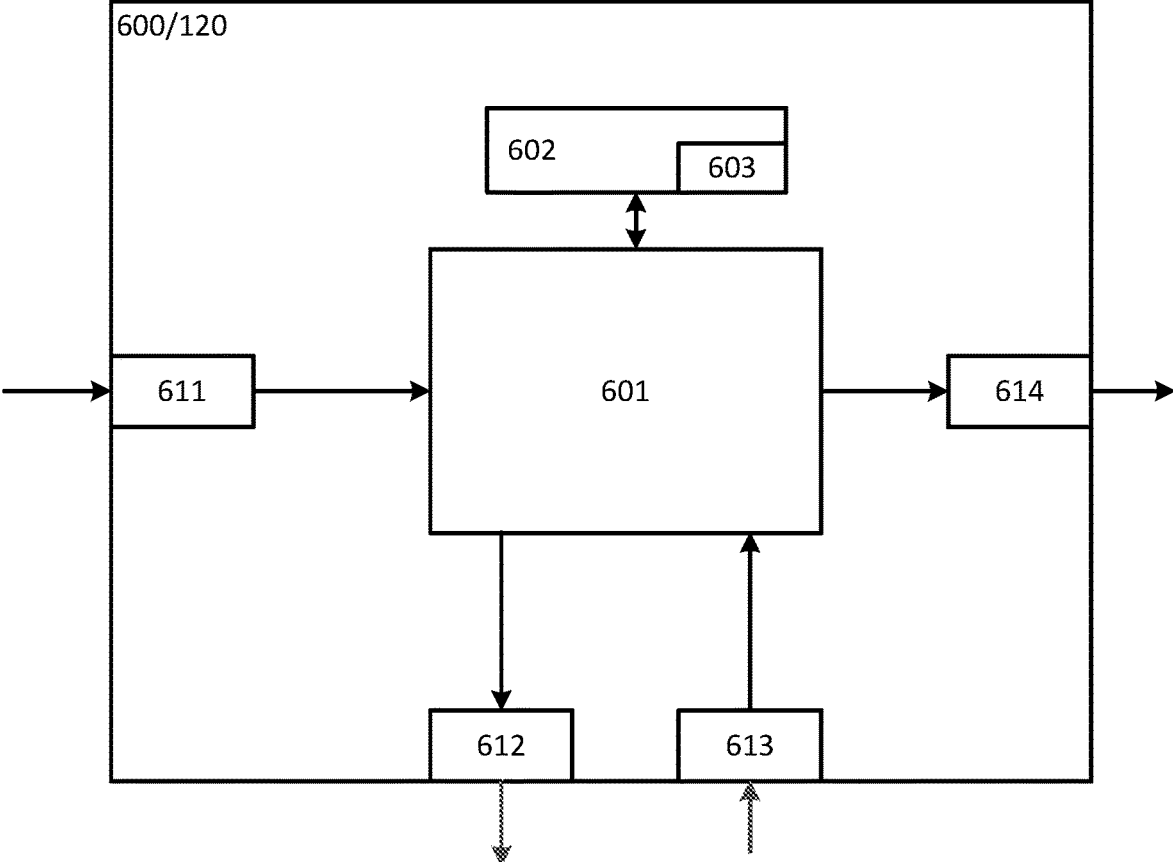
FIG. 6 shows a control arrangement, in which a method according to any one of the herein described embodiments may be implemented.

Now turning to FIG. 6 which illustrates the control arrangement 600/120, which may correspond to or may include one or more of the above-mentioned control units 121 and 122, i.e. the control units performing the method steps of the disclosed invention. The control arrangement 600/120 comprises a computing unit 601, which can be constituted by essentially any suitable type of processor or microcomputer, e.g. a circuit for digital signal processing (Digital Signal Processor, DSP), or a circuit having a predetermined specific function (Application Specific Integrated Circuit, ASIC). The computing unit 601 is connected to a memory unit 602 arranged in the control arrangement 600/120, which memory unit provides the computing unit 601 with, e.g., the stored program code and/or the stored data which the computing unit 601 requires to be able to perform computations. The computing unit 601 is also arranged to store partial or final results of computations in the memory unit 602.

In addition, the control arrangement 600/120 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing unit 601 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network CAN bus, a Media Orientated Systems Transport MOST bus, or some other bus configuration; or by a wireless connection. A person skilled in the art will appreciate that the above-stated computer can be constituted by the computing unit 601 and that the above-stated memory can be constituted by the memory unit 602.

Control systems in modern vehicles commonly comprise communication bus systems consisting of one or more communication buses for linking a number of electronic control units, ECU's, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 6, which is well known to the person skilled in the art within this technical field.

In a shown embodiment, the invention may be implemented by the one or more above mentioned control units 121 and 122. The invention can also, however, be implemented wholly or partially in one or more other control units already in the vehicle 100, or in some control unit dedicated to the invention.

Here and in this document, units are often described as being arranged for performing steps of the method according to the invention. This also includes that the units are designed to and/or configured to perform these method steps.

The control units 121 and 122 are in FIG. 1 illustrated as one unit. These and other units may, however, be logically separated but physically implemented in the same unit or can be both logically and physically arranged together. These units may e.g. correspond to groups of instructions, which can be in the form of programming code, that are input into, and are utilized by a processor/computing unit 601 when the units are active and/or are utilized for performing its method step, respectively.

The person skilled in the art will appreciate that the herein described embodiments for controlling a vehicle during a downhill start may also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. The computer-readable medium comprises a suitable memory, such as, e.g.: Read-Only Memory ROM, Programmable Read-Only Memory PROM, Erasable PROM EPROM, Flash memory, Electrically Erasable PROM EEPROM, a hard disk unit, etc.

The invention is not limited to the above described embodiments. Instead, the invention relates to, and encompasses all different embodiments being included within the scope of the independent claims.

The invention claimed is:

1. A method for a control arrangement configured to control a vehicle during a downhill start, the vehicle comprising an electric machine configured to propel and/or brake the vehicle and a brake system configured to apply a brake force to the vehicle, the method comprising, following a detection of a downhill start indication, when the vehicle is maintained stationary on an inclined road section by means of a brake force applied by a brake system:

controlling the electric machine to apply a brake torque while controlling the brake system to release the applied brake force; and controlling the electric machine to gradually decrease the applied brake torque so as to control the acceleration of the vehicle when set in motion in a downhill direction on the inclined road section.

2. The method according to claim 1, wherein the brake torque is applied by the electric machine such that the vehicle remains stationary on the inclined road section prior to setting the vehicle in motion.

3. The method according to claim 1, wherein the vehicle is to be set in motion upon the detection of the downhill start indication, the downhill start indication being one of: a brake release request, a depression of an acceleration pedal, or an automatic acceleration request, and wherein the electric machine is controlled to apply the brake torque while controlling the brake system to release the applied brake force upon detecting the downhill start indication.

4. The method according to claim 1, wherein the downhill start indication is a brake release request, and wherein a hill hold function is configured to maintain the vehicle stationary upon detecting the brake release request, the method further comprising:

commencing the control of the electric machine to apply a brake torque upon detecting the brake release request prior to or while controlling the brake system to release the applied brake force.

5. The method according to claim 4, further comprising:

controlling the brake system to maintain the applied brake force when detecting the brake release request and to release the applied brake force upon detecting a depression of an acceleration pedal upon which the vehicle is to be set in motion.

6. The method according to claim 4, further comprising:

controlling the brake system to maintain the applied brake force when detecting the brake release request and to release the applied brake force upon detecting a hill hold timer expiry upon which the vehicle is to be set in motion.

7. The method according to claim 4, further comprising:

controlling the brake system to release the applied brake force upon detecting the brake release request.

8. The method according to claim 1, wherein the electric machine is controlled to gradually decrease the brake torque at a predetermined rate based on at least one vehicle operating parameter.

9. The method according to claim 8, wherein the at least one vehicle operating parameter is one or more of:

a weight of the vehicle, an inclination of an approaching road section, traffic condition on the approaching road section, a rate of change of the acceleration request, a current drive mode, and an available force that may be transferred between the vehicle and the road.

10. The method according to claim 8, wherein the predetermined rate of gradual decrease of the brake torque applied by the electric machine is further based on a drive torque applied by a power source for propelling the vehicle, other than the electric machine.

11. The method according to claim 1, wherein the releasing of the brake force applied by the brake system is performed gradually, and wherein the predetermined rate of gradual decrease of the brake torque applied by the electric machine is further based on a rate at which the gradual releasing of the brake force is performed.

12. A control arrangement for controlling a vehicle during a downhill start, the vehicle comprising an electric machine configured to propel and/or brake the vehicle and a brake system configured to apply a brake force to the vehicle, the control arrangement being configured to, following a detection of a downhill start indication, when the vehicle is maintained stationary on an inclined road section by means of a brake force applied by a brake system:

control the electric machine to apply a brake torque while controlling the brake system to release the applied force; and control the electric machine to gradually decrease the applied brake torque so as to control the acceleration of the vehicle when set in motion in a downhill direction on the inclined road section.

13. A vehicle comprising a control arrangement for controlling the vehicle during a downhill start, the vehicle comprising an electric machine configured to propel and/or brake the vehicle and a brake system configured to apply a brake force to the vehicle, the control arrangement being configured to, following a detection of a downhill start indication, when the vehicle is maintained stationary on an inclined road section by means of a brake force applied by a brake system:

control the electric machine to apply a brake torque while controlling the brake system to release the applied force; and control the electric machine to gradually decrease the applied brake torque so as to control the acceleration of the vehicle when set in motion in a downhill direction on the inclined road section.

14. A computer program product comprising computer program code stored on a non-transitory computer-readable medium, said computer program product used for a control arrangement for controlling a vehicle during a downhill start, the vehicle comprising an electric machine configured to propel and/or brake the vehicle and a brake system configured to apply a brake force to the vehicle, said computer program code comprising computer instructions to cause one or more control units to perform the following operations, following a detection of a downhill start indication, when the vehicle is maintained stationary on an inclined road section by means of a brake force applied by a brake system:

control the electric machine to apply a brake torque while controlling the brake system to release the applied force; and control the electric machine to gradually decrease the applied brake torque so as to control the acceleration of the vehicle when set in motion in a downhill direction on the inclined road section.

* * * * *